(12) United States Patent
Zhao et al.

(10) Patent No.: US 8,501,837 B2
(45) Date of Patent: Aug. 6, 2013

(54) TIRE HAVING RUBBER COMPONENT CONTAINING SHORT FIBER REINFORCEMENT WITH COMPATABLIZER

(71) Applicants: Junling Zhao, Hudson, OH (US); Martin Paul Cohen, Fairlawn, OH (US)

(72) Inventors: Junling Zhao, Hudson, OH (US); Martin Paul Cohen, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/668,403

(22) Filed: Nov. 5, 2012

(65) Prior Publication Data

US 2013/0065984 A1    Mar. 14, 2013

Related U.S. Application Data

(62) Division of application No. 12/971,326, filed on Dec. 17, 2010, now abandoned.

(51) Int. Cl.
    *C08L 7/00* (2006.01)
(52) U.S. Cl.
    USPC .......................................... 523/351
(58) Field of Classification Search
    USPC .......................................... 523/351
    See application file for complete search history.

(56) References Cited

U.S. PATENT DOCUMENTS

| | | | |
|---|---|---|---|
| 6,598,645 B1 * | 7/2003 | Larson | 152/548 |
| 2006/0151084 A1 * | 7/2006 | Serra | 152/541 |

* cited by examiner

*Primary Examiner* — Robert D. Harlan
(74) *Attorney, Agent, or Firm* — Henry C. Young, Jr.

(57) ABSTRACT

The invention relates to a tire having a rubber component which contains short fiber reinforcement with a compatabilizer for the fiber reinforcement. Desirably said short fiber reinforcement is an aramid pulp. Desirably said compatabilizer is an epoxy functionalized natural rubber.

1 Claim, 4 Drawing Sheets

TIRE HAVING RUBBER COMPONENT CONTAINING SHORT FIBER REINFORCEMENT WITH COMPATABLIZER

FIELD OF THE INVENTION

The invention relates to a tire having a rubber component which contains short fiber reinforcement with a compatabilizer for the fiber reinforcement. Such short fibers may be, for example, aramid fiber particularly aramid fiber pulp, nylon fiber, polyester fiber and/or rayon fiber. Desirably said short fiber reinforcement is an aramid pulp. Such compatabilizer is a functionalized sulfur curable elastomer such as, for example, epoxidized natural rubber.

BACKGROUND AND PRESENTATION OF THE INVENTION

Pneumatic rubber tires have various rubber components for which sometimes enhanced stiffness of the rubber composition is a desirable feature.

Enhanced stiffness of the rubber composition might be accomplished, for example, by an inclusion of a dispersion of a small content, or amount, of short fiber reinforcement.

Sometimes aramid short fibers in a form of a pulp are used to promote an increase of stiffness for a rubber composition, a practice which is well known by those having skill in such art.

For such practice, where the short fiber is a short aramid fiber pulp, natural cis 1,4-polyisoprene rubber is used to aid in dispersing the aramid short fiber pulp in a rubber composition.

For this invention, it is desired to evaluate an effect of substituting at least a portion of such natural cis 1,4-polyisoprene rubber with a functionalized sulfur curable elastomer such as, for example, an epoxidized natural rubber (epoxidized natural cis 1,4-polyisoprene rubber).

A challenge is therefore presented for enhancing short fiber reinforcement, particularly aramid short fiber pulp reinforcement of rubber compositions.

In the description of this invention, the terms "rubber" and "elastomer" where used, are used interchangeably, unless otherwise prescribed. The terms "rubber composition", "compounded rubber" and "rubber compound", where used, are used interchangeably to refer to "rubber which has been blended or mixed with various ingredients" and the term "compound" relates to a "rubber composition" unless otherwise indicated. Such terms are well known to those having skill in the rubber mixing and rubber compounding art.

In the description of this invention, the term "phr" refers to parts of a respective material per 100 parts by weight of rubber, or elastomer. The terms "cure" and "vulcanize" are used interchangeably unless otherwise indicated.

SUMMARY AND PRACTICE OF THE INVENTION

In accordance with this invention, a tire is provided having a component of a rubber composition containing a dispersion therein of short organic fibers comprised of, based on parts by weight per 100 parts by weight rubber (phr):

(A) 100 phr of conjugated diene-based elastomers comprised of:
(1) from zero to about 95, alternately from about 10 to about 95, phr of at least one of polymers and copolymers of isoprene and 1,3-butadiene and copolymers of styrene with at least one of isoprene and 1,3-butadiene, (non-functionalized elastomers), and
(2) about 5 to about 100, alternately from about 5 to about 90, phr of a functionalized sulfur curable elastomer as a compatabilizer for said short organic fibers within said rubber composition comprised of at least one of polymers and copolymers of isoprene and 1,3-butadiene and copolymers of styrene with at least one of isoprene and 1,3-butadiene, preferably comprised of at least one of functionalized cis 1,4-polyisoprene elastomer and functionalized styrene/butadiene elastomer (functionalized SBR), with functional groups interactive with said organic fibers comprised of at least one of epoxy groups, amine groups (e.g. amine functionalized SBR), hydroxyl groups (e.g. hydroxyl functionalized SBR), carboxyl groups, maleic group and maleimide group (e.g. maleated SBR), preferably epoxy groups and preferably expoxy functionalized natural cis 1,4-polyisoprene rubber having an epoxidation in a range of from about 5 to about 60 percent;

(B) about 30 to about 100 phr of particulate reinforcement comprised of:
(1) rubber reinforcing carbon black, or
(2) synthetic amorphous silica (e.g. precipitated silica), or
(3) combination of rubber reinforcing carbon black and synthetic amorphous silica (e.g. precipitated silica) containing up to about 80 phr of said precipitated silica together with a silica coupler for said silica;

(C) about 0.5 to about 30 phr of said short organic fibers wherein said short organic fibers are comprised of at least one of aramid fiber (e.g. short aramid fiber pulp), polyester fiber nylon fiber and rayon fiber, preferably said aramid fiber pulp.

In practice, said rubber composition may also contain up to about 50 phr of at least one of clay and calcium carbonate, alternately up to about 10 phr of clay and up to about 50 phr of calcium carbonate.

A purpose of the compatabilizer elastomer is to compatabilize said organic short fiber, particularly said short aramid fiber pulp, with said rubber composition.

Accordingly, said short organic fiber may be, for example, short aramid fiber pulp.

Said compatabilizer elastomer may be, for example, expoxidized cis 1,4-polyisoprene rubber.

In further accordance with this invention, a method of preparing a rubber composition is comprised of:

(A) mixing said short organic fibers (e.g. said aramid short fiber pulp) and said compatabilizer elastomer (as a solid compatibilzer elastomer) with said rubber composition (comprised of solid elastomer or elastomers) rubber to enable said compatibilzer elastomer to compatabilize said short organic fibers (e.g. said aramid short fiber pulp) with said elastomers of said rubber composition in situ with said rubber composition, or (B) mixing a pre-formed masterbatch with said rubber composition wherein said masterbatch is comprised of a dispersion of said organic short fibers (e.g. said aramid short fiber pulp) blended with as least one of said functionalized elastomers as a (solid) functionalized elastomer (e.g. solid epoxidized cis 1,4-polyisoprene rubber or solid functionalized SBR elastomer), or (C) mixing a pre-formed masterbatch with said rubber composition wherein said masterbatch is comprised of at least one of said organic short fibers (e.g. aramid short fiber pulp) and least one of said functionalized elastomer as:
(1) a coagulated functionalized elastomer from a latex (aqueous latex) thereof (e.g. an epoxidized cis 1,4-polyisoprene rubber latex or functionalized SBR latex), or (2) a recovered functionalized elastomer from an organic solution thereof (e.g. an epoxidized cis 1,4-polyisoprene rubber or functionalized SBR).

In additional accordance with this invention, a tire is provided having a tread comprised of the rubber composition prepared by said method.

In further accordance with this invention, said method further comprises preparing a tire with a tread comprised of the rubber composition prepared by said method.

A significant aspect of this invention is promoting an improved bonding strength between the short fiber and sulfur cured rubber matrix through the inclusion of the functionalized elastomer in the rubber composition, particularly, for example, by use of an epoxidized natural rubber as a compatabilizer for aramid short fiber pulp.

This is considered herein to also be significant in a sense of promoting improved (increased) de-bonding strength between the short fibers and associated rubber composition and, also for promoting higher (greater) stiffness of the cured rubber composition. Various rubber reinforcing carbon blacks might be used. Representative of various rubber reinforcing blacks are found in *The Vanderbilt Rubber Handbook* (1978), Page 417.

In practice, the rubber composition may be prepared, for example, in at least one preparatory (non-productive) mixing step in an internal rubber mixer, often a sequential series of at least one, usually two, separate and individual preparatory internal rubber mixing steps, or stages, in which the diene-based elastomer is first mixed with the prescribed silica (if used) and carbon black, aramid short fibers, and compatabilizer elastomer, or aramid short fiber masterbatch with said compatabilizer elastomer, followed by a final mixing step (productive mixing step) in an internal rubber mixer, or optionally on an open mill mixer, where curatives (sulfur and sulfur vulcanization accelerators) are blended at a lower temperature and for a substantially shorter period of time.

It is conventionally required after each internal rubber mixing step that the rubber mixture (rubber composition) is actually removed from the rubber mixer and cooled to a temperature below 40° C., perhaps to a temperature in a range of about 20° C. to about 40° C. and then added back to an internal rubber mixer for the next sequential mixing step, or stage.

Such non-productive mixing, followed by productive mixing is well known by those having skill in such art.

The forming of a tire component is contemplated to be by conventional means such as, for example, by extrusion, or by calendering, of rubber composition to provide a shaped, unvulcanized rubber component such as a tire tread layer. Such forming of a tire tread (layers) is well known to those having skill in such art.

It is understood that a tire, as a manufactured article, is prepared by shaping and curing the assembly of its components at an elevated temperature (e.g. 140° C. to 170° C.) and elevated pressure in a suitable mold. Such practice is well known to those having skill in such art.

It is readily understood by those having skill in the pertinent art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of fatty acids, if used, which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least two stages, namely, at least one non-productive (preparatory) stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The following example is presented to further illustrate the practice of this invention. The parts and percentages are by weight unless otherwise indicated.

BRIEF DESCRIPTION OF THE DRAWINGS

The invention will be described by way of example and with reference to accompanying drawings in which.

EXAMPLE I

Figure 1:
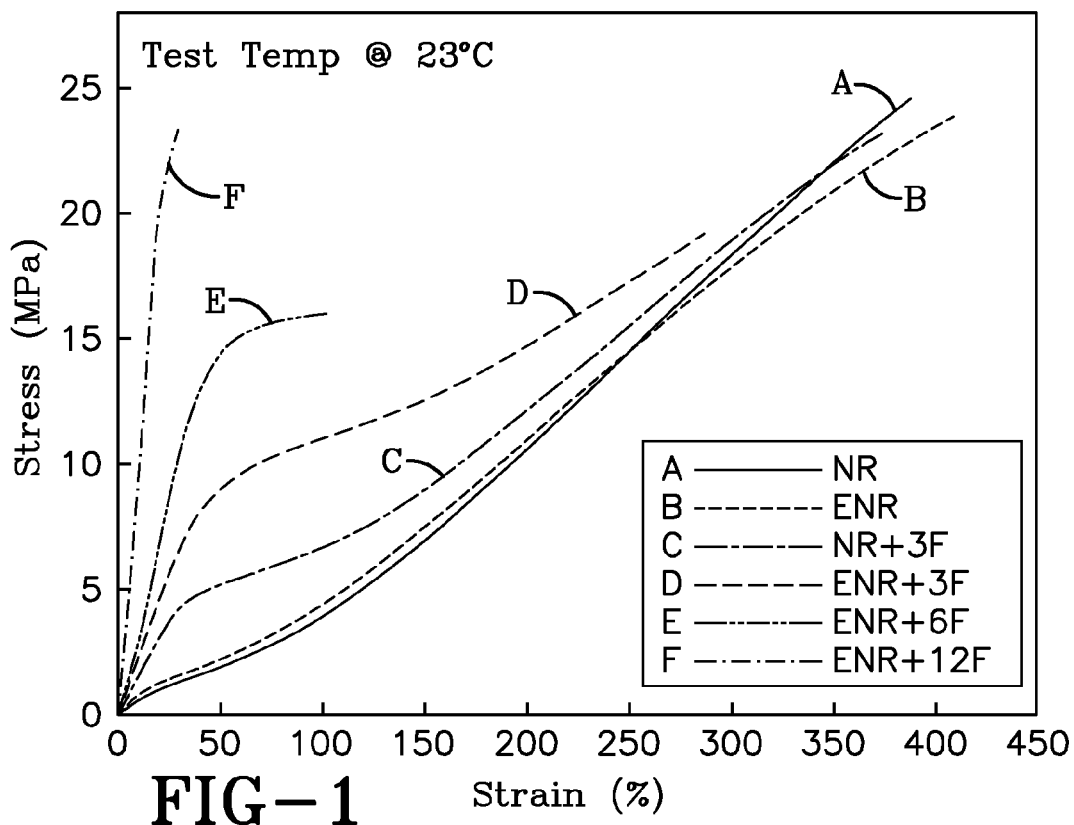
FIG. 1 and FIG. 2 graphically present Stress (MPa) versus dynamic Strain (%) at 23° C. for FIG. 1 and at 150° C. for FIG. 2 for curves A, B, C, D, E and F for the Samples in Table 2 of Example I.

Rubber compositions were prepared for evaluating an effect of providing short fiber aramid pulp reinforcement in a rubber composition together with an epoxy functionalized natural rubber as a compatibilzer for the short aramid fiber pulp reinforcement.

Control rubber Samples A and B are rubber compositions which contain natural cis 1,4-polyisoprene rubber (NR) and epoxidized natural rubber (ENR), respectively, without aramid fiber pulp reinforcement.

Comparative rubber Sample C contained cis 1,4-polyisoprene natural rubber with an inclusion of 3 phr of a dispersion of short aramid fiber pulp reinforcement.

Experimental rubber Samples D, E and F contained epoxidized natural rubber with an inclusion of 3 phr, 6 phr and 12 phr, respectively, of short aramid fiber pulp reinforcement.

The rubber compositions were prepared by mixing the ingredients in sequential non-productive (NP) and productive (PR) mixing steps in one or more internal rubber mixers.

The basic formulation for the rubber Samples is presented in the following Table 1 and presented in terms of parts by weight unless otherwise indicated.

TABLE 1

|  | Parts |
|---|---|
| Non-Productive Mixing Step (NP), (mixed to 160° C.) | |
| Natural cis 1,4-polyisoprene rubber[1] | 100 and 0 |
| Epoxidized natural rubber[2] | 0 and 100 |
| Antioxidant[3] | 2 |
| Carbon black (N330)[4] | 50 |
| Processing oil[5] | 5 |
| Fatty acid[6] | 3 |
| Zinc oxide | 5 |
| Aramid pulp, short fiber[7] | 0 and variable |
| Productive Mixing Step (PR), (mixed to 110° C.) | |
| Sulfur and sulfur cure accelerators[8] | 4 |

[1]Natural cis 1,4-polyisoprene rubber
[2]Expoxidized cis 1,4-polyisoprene rubber as ENR50 ™, a 50 percent expoxidized natural rubber from Malaysia company
[3]Antoxidant of the diamine type
[4]Rubber reinforcing carbon black as N330, an ASTM designation
[5]Rubber processing oil, primarily aromatic rubber processing oil
[6]Fatty acid comprised primarily of stearic acid and a minor amount of other fatty acids comprised primarily of palmitic and oleic acids.
[7]Aramid short fiber pulp (not a natural rubber/aramid pulp masterbatch) from du Pont de Nemours.
[8]Sulfur and sulfur cure accelerators of the sulfenamide and thiuram types The rubber Samples were prepared to evaluate the inclusion of short aramid fiber pulp with the expoxidized natural rubber compatabilizer, as illustrated in the following Table 2 with the rubber and aramid fiber pulp reported in terms of parts per 100 parts by weight of rubber (phr) for the rubber Samples A through F.

Table 2 also reports a summary of various physical properties.

TABLE 2

|  | Rubber Samples | | | | | |
|---|---|---|---|---|---|---|
|  | A | B | C | D | E | F |
| Short aramid fiber pulp (phr) | 0 | 0 | 3 | 3 | 6 | 12 |
| Natural cis 1,4-polyisoprene rubber (phr) | 100 | 0 | 100 | 0 | 0 | 0 |
| Epoxidized natural rubber (phr) | 0 | 100 | 0 | 100 | 100 | 100 |
| Summary of Various Physical Properties | | | | | | |
| Rubber Processing Characteristic RPA[1] 100° C., 0.83 Hertz, 15% strain | | | | | | |
| Uncured rubber, elastic modulus G' (kPa) | 153 | 126 | 135 | 107 | 117 | 113 |
| Storage Modulus RPA[1], 100° C., 11 Hertz | | | | | | |
| Elastic storage modulus G' at 1% strain, (kPa) | 2688 | 2072 | 3002 | 3326 | 3825 | 4266 |
| Percent increase with 3 phr of short aramid fiber | — | — | 12 | 24 | — | — |
| Elastic storage modulus G' at 10% strain, (kPa) | 1662 | 1191 | 1851 | 1913 | 2190 | 2171 |
| Percent increase with 3 phr of short aramid fiber | — | — | 12 | 15 | — | — |
| Tan Delta, RPA[1] 100° C., 11 Hertz | | | | | | |
| Tan delta at 10% strain | 0.107 | 0.175 | 0.108 | 0.165 | 0.160 | 0.168 |
| Percent increase with 3 phr of short aramid fiber | — | — | 0 | 54 | — | — |

[1]Rubber Process Analyzer

From the Summary of Various Physical Properties reported in Table 2 it can be seen that physical interaction of the short aramid fiber pulp with the ENR (epoxidized natural rubber) containing rubber composition is considerably greater than with the natural rubber composition without the expoxidized natural rubber.

This phenomenon can be readily seen that for the rubber compositions containing 3 phr of the short aramid fiber pulp that the storage modulus (G') at 1 percent strain increased by 24 percent for the ENR rubber and only 12 percent for the natural rubber which is indicative of beneficially increased interaction of the fiber in the ENR rubber composition.

This phenomenon can also be seen for the rubber compositions containing 3 phr of the short aramid fiber pulp that the storage modulus (G') at 10 percent strain increased by 15 percent for the ENR rubber and only 12 percent for the natural rubber which is indicative of beneficially increased interaction of the fiber in the ENR rubber composition.

This phenomenon can further be seen for the rubber compositions containing 3 phr of the short aramid fiber pulp that the Tan delta property at 10 percent strain increased by 54 percent for the ENR rubber and virtually no increase in the Tan delta value for the natural rubber which is further indicative of beneficially increased interaction of the fiber in the ENR rubber composition.

In the Drawings

Figure 2:
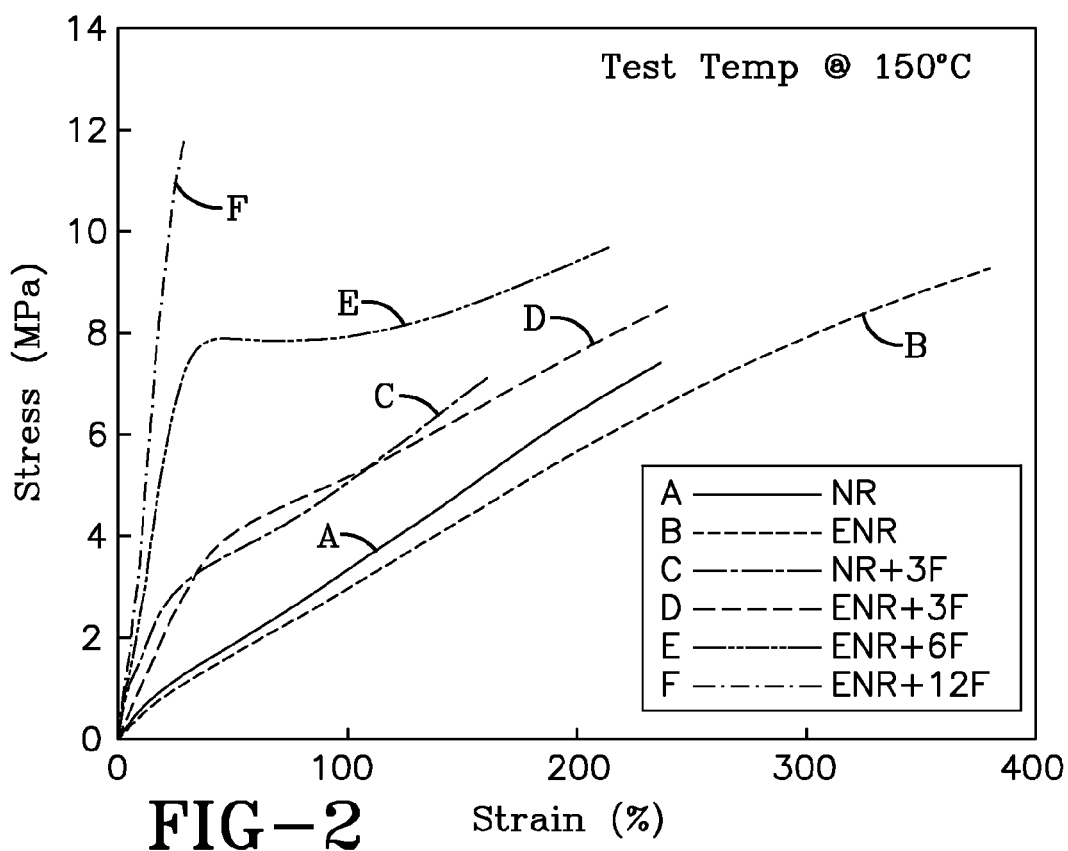

For the physical properties reported for the rubber Samples in the above Table 2:

(A) FIGS. 1 and 2 graphically present Stress (MPa) versus dynamic Strain (%) at 23° C. for FIG. 1 and at 150° C. for FIG. 2.

Figure 3:
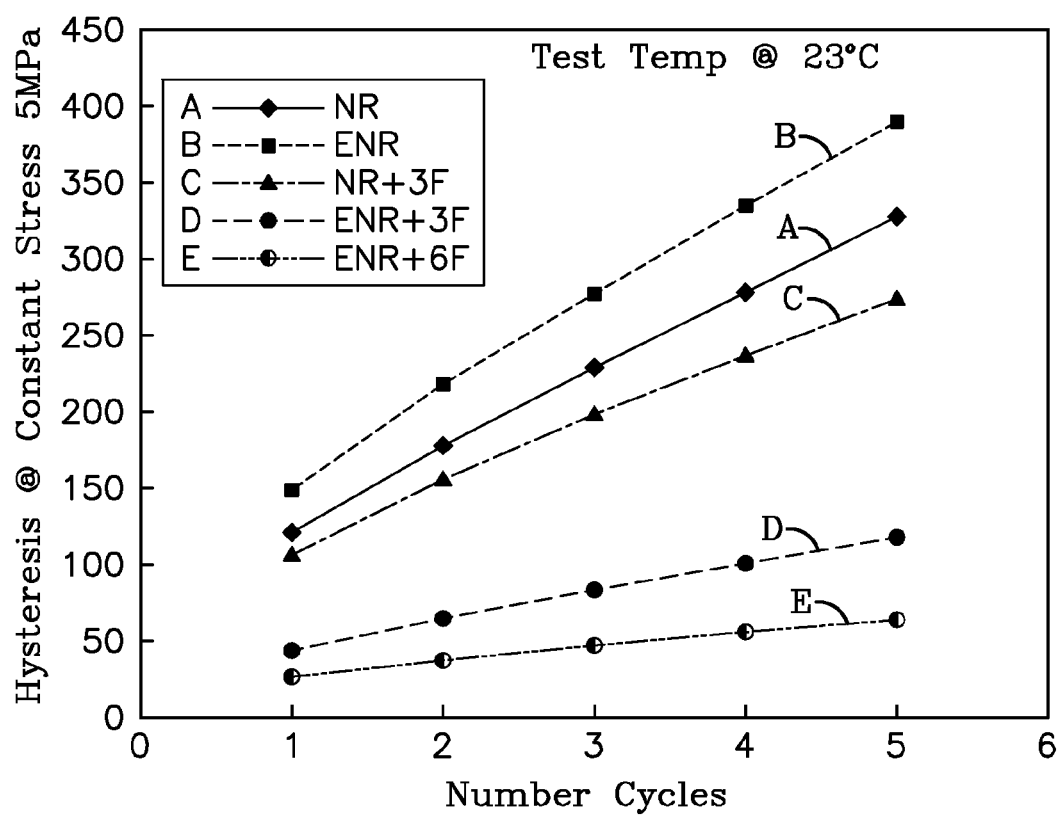
FIG. 3 graphically presents hysteresis in term of a hysteresis loop test at a constant maximum stress of 5 MPa for curves A, B, C, D, E and F for the Samples in Table 2 of Example I.

(B) FIG. 3 graphically presents hysteresis in terms of a hysteresis loop test at a constant maximum stress of 5 MPa.

In particular, it can be seen from FIG. 1 (Stress versus Strain at 23° C. using an Instron™ analytical instrument, ASTM D412) that, compared to the curves for the natural rubber (curve A) and the ENR (curve B) that, while the inclusion of 3 phr of the short aramid fiber in the natural rubber (curve C) increased its stiffness, namely that it increased the rubber's stress value, the inclusion of 3 phr of the short aramid fiber in the ENR rubber (curve D) increased the rubber's stiffness (stress value) by a significantly greater margin which is indicative of significantly greater interaction of the short aramid fiber with the ENR rubber.

It can further be seen from FIG. 1 that, as the loading of the short aramid fiber in the ENR rubber increased from the 3 phr level (curve D) to levels of 6 phr (curve E) and 12 phr (curve F), the stiffness (stress value) of the ENR rubber increased dramatically to thereby further indicate a greater interaction of the short aramid fibers with the ENR.

This is considered herein to be significant in a sense that FIG. 1 demonstrates that the interaction of the short aramid fibers had a significantly greater interaction effect for the ENR than for the natural rubber composition.

In particular, it can be seen from FIG. 2 (Stress versus Strain at an increased temperature of 150° C. using an Instron™ analytical instrument, ASTM D412) that, compared to the curves for the natural rubber (curve A) and the ENR (curve B) that the inclusion of 3 phr of the short aramid fiber in the natural rubber (curve C) and in the ENR (curve D) similarly increased their stiffness values, namely their stress values, the fiber-containing ENR (curve D) extended further until the rubber sample broke (a longer curve D line compared to the curve C line) thereby suggesting a greater elongation durability short aramid fiber-containing ENR (curve D).

It can further be seen from FIG. 2 that, similar to FIG. 1, as the loading of the short aramid fiber in the ENR rubber increased from the 3 phr level (curve D) to levels of 6 phr (curve E) and 12 phr (curve F), the stiffness (stress value) of the ENR rubber increased dramatically to thereby further indicate a greater interaction of the short aramid fibers with the ENR.

It can be seen from FIG. 3 (Hysteresis at Constant Stress of 5 MPa versus Number of Cycles for the dynamic test) that hysteresis values for all of the natural rubber (curve A), ENR rubber (curve B) and 3 phr short aramid fiber containing ENR (curve C), were significantly higher than hysteresis values for the 3 phr and 6 phr short aramid fiber containing ENR rubber which is a further indication of better interaction of the short aramid fibers with the ENR. The reduction in hysteresis is considered to be a particularly beneficial effect for the short aramid fiber loaded ENR rubber in a sense that, as the hysteresis effect is reduced, significantly beneficially less internal heat build up in the ENR based rubber composition is expected.

EXAMPLE II

Additional rubber compositions were prepared for evaluating an effect of providing epoxidized natural rubber as a compatabilizer for short fiber aramid pulp reinforcement in a rubber composition comprised of cis 1,4-polybutadiene rubber, natural cis 1,4-polybutadiene rubber and isoprene/butadiene rubber (IBR) containing 1.6 phr of the aramid short fiber pulp.

Control rubber Sample G contains elastomers composed of cis 1,4-polybutadiene rubber, natural cis 1,4-polyisoprene rubber and IBR together with reinforcing filler as rubber reinforcing carbon black without the ENR compatabilizer.

Experimental rubber Samples H and I contained elastomers provided an inclusion of the 1.6 phr of the short aramid fiber pulp together with 6 and 12 phr, respectively, of epoxidized natural compatabilizer for the short aramid fiber pulp.

The rubber compositions were prepared by mixing the ingredients in sequential non-productive (NP) and productive (PR) mixing steps in one or more internal rubber mixers.

The basic formulation for the rubber Samples is presented in the following Table 3 and recited terms of parts by weight unless otherwise indicated.

TABLE 3

| | Parts |
|---|---|
| Non-Productive Mixing Step (NP), (mixed to 160° C.) | |
| Isoprene/butadiene (IBR) rubber[9] | 36.75 |
| Cis 1,4-polybutadiene rubber[10] | 36.75 |
| Natural cis 1,4-polyisoprene rubber | 26.5, 20.5, 14.5 |
| Epoxidized natural rubber (ENR50) | 0, 6, 12 |
| Antioxidant | 3 |
| Carbon black (N550) | 51 |
| Resin[11] | 1.2 |
| Fatty acid | 0.5 |
| Zinc oxide | 5 |
| Aramid pulp | 1.6 |
| Productive Mixing Step (PR), (mixed to 110° C.) | |
| Sulfur and sulfur cure accelerators | 9.5 |

[9] Tin coupled IBR rubber as a 30/70 isoprene/butadiene rubber from The Goodyear Tire and Rubber Company
[10] Cis 1,4-polybutadiene rubber as BUD1208 ™ from The Goodyear Tire and Rubber Company
[11] non staining, unreactive 100 percent phenol formaldehyde resin The rubber Samples were prepared to evaluate the inclusion of short aramid fiber pulp with the expoxidized natural rubber compatibilizer, as illustrated in the following Table 4 with the rubber and aramid fiber pulp reported in terms of parts per 100 parts by weight of rubber (phr) for the rubber Samples G, H, and I.

TABLE 4

|  | G | H | I |
|---|---|---|---|
| Natural cis 1,4-polyisoprene rubber (phr) | 26.5 | 20.5 | 14.5 |
| Epoxidized natural rubber (phr) | 0 | 6 | 12 |
| Short aramid fiber pulp (phr) | 1.6 | 1.6 | 1.6 |
| Sulfur (phr) | 3 | 3 | 3 |
| Accelerators (phr) | 6.5 | 6.5 | 6.5 |
| Summary of Various Physical Properties | | | |
| Rubber Processing Characteristic RPA[1] 100° C., 0.83 Hertz, 15% strain | | | |
| Uncured rubber, elastic modulus G' (kPa) | 197 | 199 | 213 |
| Elastic Storage Modulus RPA[1] 100° C., 11 Hertz | | | |
| Modulus G', 1% strain (kPa) | 3464 | 3522 | 3857 |
| Modulus G', 10% strain (kPa) | 2781 | 2789 | 2991 |
| Tan delta, RPA[1] 100° C., 11 Hertz | | | |
| Tan delta at 10% strain | 0.06 | 0.07 | 0.08 |

[1]Rubber Process Analyzer

In Table 4, from the Summary of Various Physical Properties it can be seen that the cured modulus G' increased progressively for rubber Samples H and I as the amount of ENR compatabilizer increased from 6 phr to 12 phr for both the 1 percent and 10 percent test conditions as compared to modulus G' values of 3464 kPa and 2781 kPa, respectively, for rubber Sample G with no ENR being added.

This is considered herein to be significant in a sense showing the beneficial effect of the increasing presence of the ENR in the rubber composition as a compatabilizer for the fiber/rubber composite to enable an indication of greater filler/rubber interaction which is a desirable effect.

In the Drawings

Figure 4:
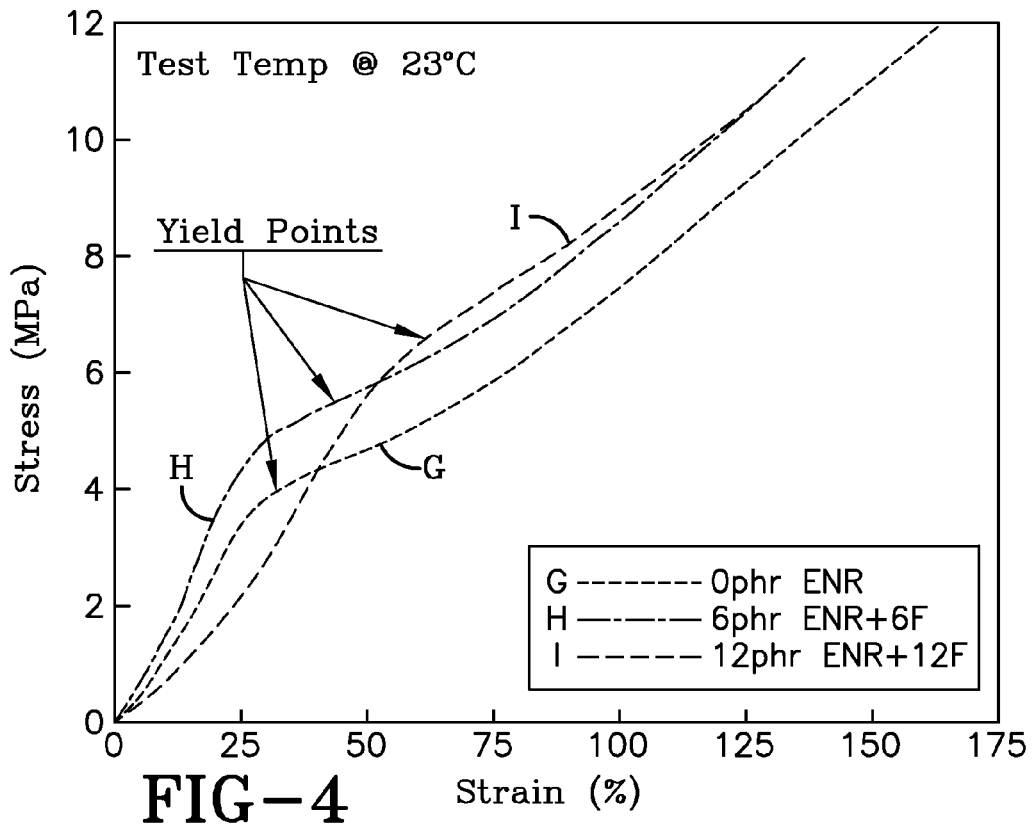
FIG. 4 and FIG. 5 are graphical presentations of Stress (MPa) versus dynamic Strain (%) at test temperature of 23° C. for FIG. 4 and 150° C. for FIG. 5 for rubber Samples G, H and I in Table 2 of Example I.
Figure 5:
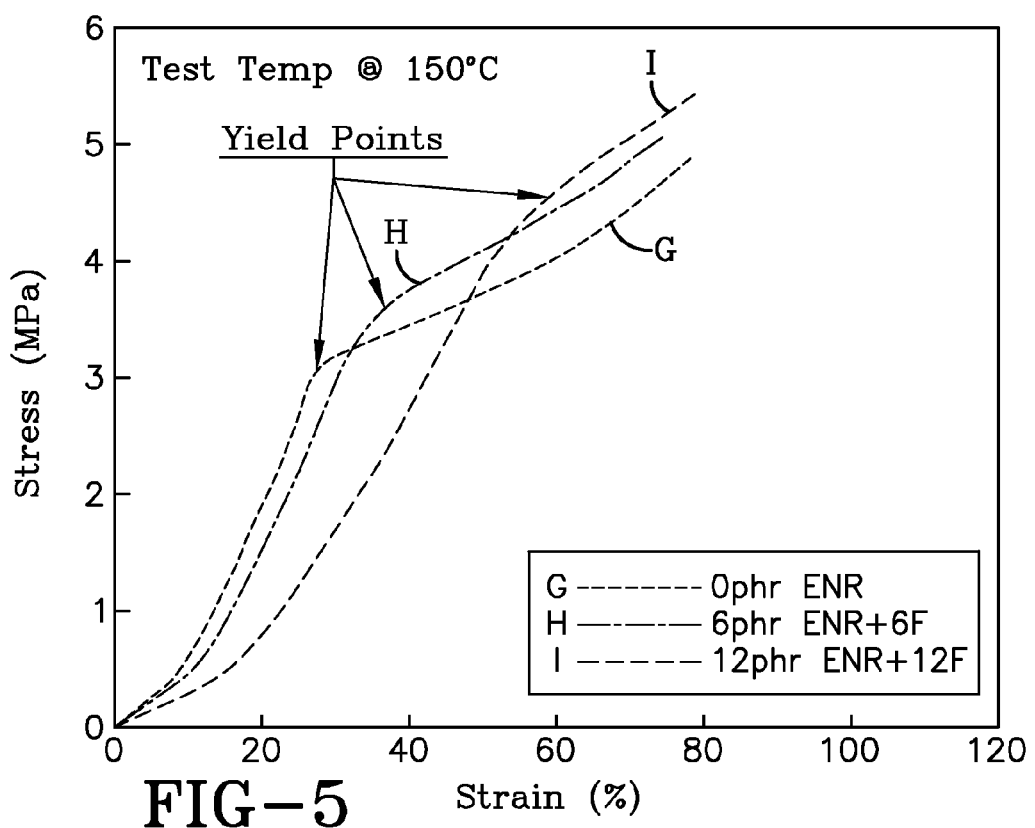

For the rubber Samples reported in the above Table 4:

FIGS. 4 and 5 are graphical presentations of Stress (MPa) versus dynamic Strain (%) at test temperatures of 23° C. and 150° C., respectively, for the aforesaid rubber Samples G, H and I.

In both FIGS. 4 and 5 Yield "Points" are shown which are represented by inflections in the curves for each of rubber Samples G, H and I where the ENR content increased from zero percent (Sample G) to 6 and 12 phr for Samples H and I, respectively.

In FIG. 4 (23° C. test condition) the Yield Points (cure inflection regions) progressively and significantly increased with both higher Stress and Strain values as the ENR contents progressed from zero (Sample G) to 6 phr (Sample H) to 12 phr (Sample I).

The advancing Yield Points in FIG. 4 (23° C. test condition) for Samples H and I is indicative of progressively increasing bonding strength between the short fibers and rubber which is envisioned as evidence of an increasing fiber/rubber compatibilizing effect of the increasing ENR content which is a desirable effect.

Advancing Yield Points in FIG. 5 (150° C. test condition) can similarly be seen for Samples H and I which is also indicative of progressively increasing bonding strength between the short fibers and rubber which is also envisioned as evidence of an increasing fiber/rubber compatibilizing effect of the increasing ENR content at the higher temperature which is a desirable effect.

EXAMPLE III

Use of Aramid Fiber Masterbatch

A fiber masterbatch was prepared by dry blending aramid fiber pulp and epoxidized natural rubber for use in evaluating an effect of using epoxidized natural rubber to aid in compatabilizing the aramid fiber pulp with the rubber composition and to promote bonding strength to the aramid fibers.

The aramid fiber/epoxidized natural rubber masterbatch is shown in the following Dry Fiber Masterbatch Table where the amounts are presented in parts of weight per 100 parts of rubber (phr) unless otherwise indicated.

TABLE

| Dry Fiber Masterbatch | |
|---|---|
| Ingredients | Dry Fiber Masterbatch |
| Epoxidized natural rubber (phr) | 100 |
| Rubber reinforcing carbon black (N550) (phr) | 60 |
| Aramid short fiber pulp (phr) | 26.65 |

Rubber compositions were prepared for evaluation an effect of providing short aramid fibers as a pre-formed masterbatch with epoxidized natural rubber with the epoxidized natural rubber being used as a compatiblizer for the aramid fiber to promote improved bonding strength to the aramid fiber.

Control rubber Sample J is prepared without the epoxidized natural rubber and Experimental rubber Sample K is prepared with a combination of epoxidized natural rubber and the Fiber Masterbatch rubber sample.

The rubber Samples were prepared by mixing the ingredients in sequential non-productive (NP) and productive (P) mixing steps in internal rubber mixers.

The formulations are shown in the following Table 6 for Samples J and K with parts and percentages presented in terms of weight unless otherwise indicated.

TABLE 6

| Basic Formulations | | |
|---|---|---|
|  | J | K |
| Non-Productive Mixing Step (NP) to about 160° C. | | |
| Isoprene/Butadiene (IBR) rubber (phr) | 36.75 | 36.75 |
| Cis 1,4-polybutadiene rubber (phr)[10] | 36.75 | 36.75 |
| Natural cis 1,4-polyisoprene rubber (NR) (phr) | 26.5 | 0 |
| Epoxidized natural rubber (ENR50) (phr) | 0 | 20.5 |
| Antioxidant | 4 | 4 |
| Rubber reinforcing carbon black (N550) | 56 | 47.9 |
| Resin 11 | 1.2 | 1.2 |
| Fatty acid | 0.5 | 0.5 |
| Zinc oxide | 5 | 5 |
| Dry Fiber masterbatch | 0 | 11.1[a] |
| Productive Mixing Step (P) to about 110° C. | | |
| Sulfur | 4 | 3 |
| Sulfur cure accelerator(s) | 8 | 6.5 |

[a]Parts by weight composed of 1.5 phr of fiber, 3.6 phr of carbon black, and 6 phr of ENR The following Table 7 illustrates a summary of rubber Samples followed by a cure behavior as various physical properties of the Rubber Samples based on the basic formulations presented in preceding Table 6 with the parts and percentages presented in terms of weight unless otherwise indicated.

TABLE 7

|  | J | K |
| --- | --- | --- |
| Epoxidized natural rubber (phr) | 0 | 20.5 |
| Carbon black (N550) (phr) | 56 | 47.9 |
| Fiber Masterbatch (Table 5) (parts by weight) | 0 | 11.1 |
| Summary of Various Physical Properties | | |
| Rubber Processing Characteristic RPA[1] 100° C., 0.83 Hertz, 15% strain | | |
| Uncured rubber, elastic modulus G' (kPa) | 204 | 230 |
| Elastic Storage Modulus RPA[1] 100° C., 11 Hertz | | |
| Modulus G', 1% strain (kPa) | 4569 | 3857 |
| Modulus G', 10% strain (kPa) | 3196 | 2931 |
| Tan delta, RPA[1] 100° C., 11 Hertz | | |
| Tan delta at 10% strain | 0.1 | 0.07 |

|  | J | K@P With Grain | K@L Against Grain |
| --- | --- | --- | --- |
| Stress-Strain Test at 23° C. | | | |
| 25% Modulus (MPa) | 0.96 | 1.11 | 0.88 |
| 50% Modulus (MPa) | 2.29 | 3.28 | 2.71 |
| 100% Modulus (MPa) | 6.11 | 9.26 | 6.86 |
| Tensile strength (MPa) | 6.47 | 14.7 | 13.7 |
| Elongation at break (%) | 104 | 173 | 185 |
| Energy at break (J) (joules) | 0.43 | 1.89 | 1.64 |
| Stress-Strain Test at 150° C. | | | |
| 25% Modulus (MPa) | 0.59 | 0.54 | 0.47 |
| 50% Modulus (MPa) | 1.89 | 2.09 | 1.88 |
| Tensile strength (MPa) | 2.96 | 5.83 | 4.84 |
| Elongation at break (%) | 68.6 | 95.3 | 96.3 |
| Energy at break (J) (joules) | 0.15 | 0.33 | 0.29 |

[1]Rubber Process Analyzer

From Table 7 it can be seen that the tensile strength at break (stress at break) of rubber Sample K, with the masterbatch of ENR compatiblizer and aramid pulp, increased to a value of over 13 MPa (13.7 MPa for K@L and 14.7 MPa for K@P), which is an increase of about 100 percent compared to a value of about 6.5 MPa for rubber Sample J which did not contain the ENR or fiber/natural rubber masterbatch.

Elongation at break for rubber Sample K increased to a value of at least about 170 percent (185 percent for K@L and 173 percent for K@P), an increase of at least about 66 percent compared to a value of about 104 percent for rubber Sample J which did not contain the ENR or fiber/natural rubber masterbatch.

Energy at break at 23° C. for rubber Sample K (prepared with the pre-formed masterbatch of aramid fiber and ENR) increased to a value of about 1.9 joules (an increase of about 150 percent) as compared to a value of about 0.4 joules for rubber Sample J (which did not contain the inclusion of the pre-formed masterbatch of aramid fiber and ENR).

These observations are considered herein to be significant as they are indicative of greater durability of rubber Sample K with the inclusion of the pre-formed aramid fiber/ENR masterbatch as compared to rubber Sample J without the aramid fiber/ENR masterbatch.

In the Drawings

Figure 6:
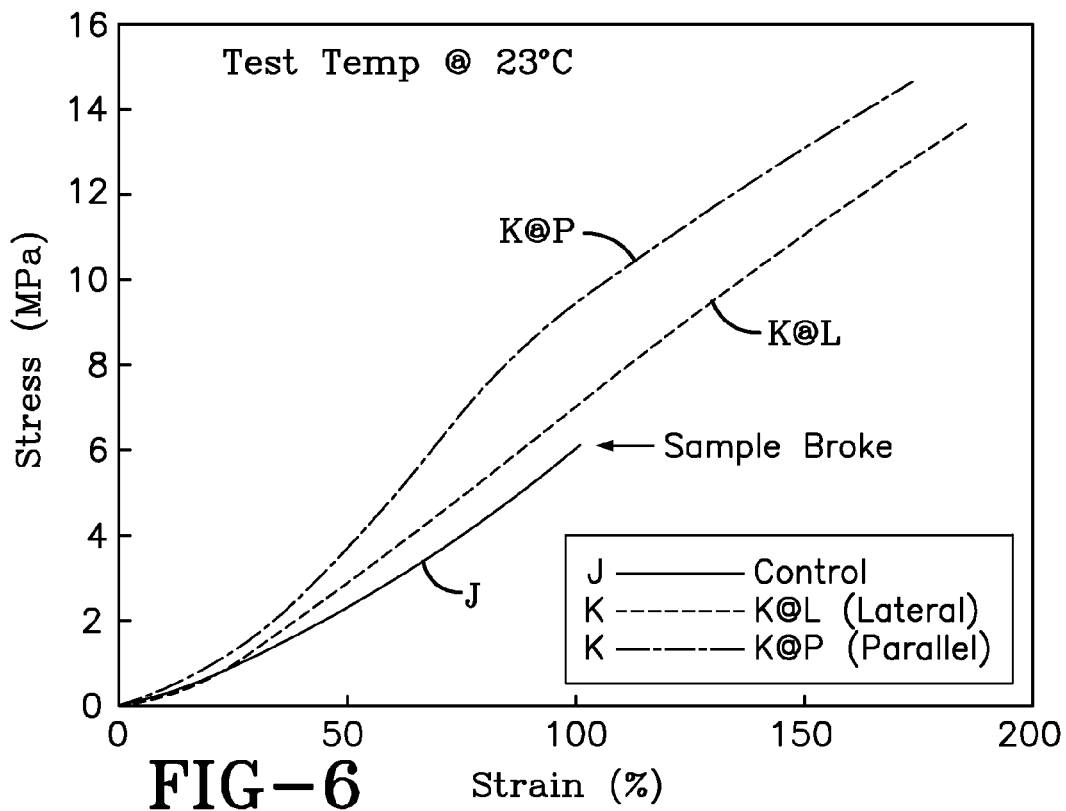
FIG. 6 and FIG. 7 are graphical presentations of Stress (MPa) versus dynamic Strain (%) for rubber Sample J (Control) and K (Experimental) at 23° C. and 150° C., respectively, of Table 7 in Example II.
Figure 7:
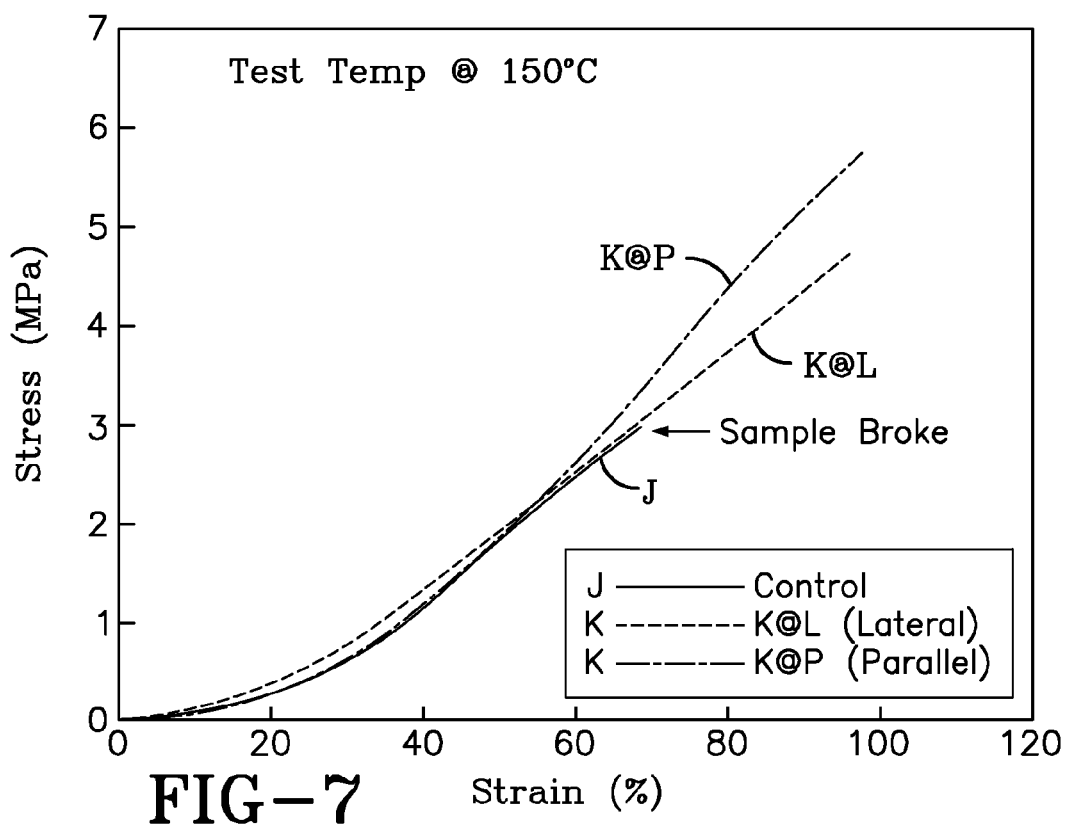

For the rubber Samples reported in the above Table 7:

FIGS. 6 and 7 are graphical presentations of Stress (MPa) and Strain (%) for rubber Samples J (Control) and K (Experimental) at 23° C. and 150° C., respectively.

The K@L curves in FIGS. 6 and 7 represent Stress versus Strain curve for the Stress measurement for Experimental rubber Sample K taken laterally (about 90 degrees or at a right angle) and the K@P curves for the measurement taken in a parallel direction (about 0 degrees) to its grain.

In the Drawings: For the 23° C. Test Shown in FIG. 6

(A) for Control Rubber Sample J

Control rubber Sample J (without both ENR compatiblizer and short fiber reinforcement) broke at a strain (elongation) of about 100 percent at a stress (tensile strength) of about 6 MPa, prior to its intended completion of the tests.

(B) for Experimental Rubber Sample K@P

In contrast, for Experimental rubber Sample K, the K@P Stress value at about 100 percent strain (where rubber Sample J broke) increased to about 9.3 MPa without breaking, as reported in Table 7, representing an increase in Stress value at 100 percent strain, or elongation, of over 50 percent—without breaking.

Further, Experimental rubber Sample K@P broke at a strain (elongation) of 173 percent and a stress of about 14.7 MPa, an increase in strain (elongation) of at least 70 percent and in ultimate stress, or tensile strength, of over 120 percent, compared to rubber Sample J.

(C) for Experimental Rubber Sample K@L

In further contrast, for Experimental rubber Sample K, the K@L Stress value at about 100 percent strain (where rubber Sample J broke) increased to about 6.9 MPa without breaking, as reported in Table 7, representing an increase in Stress value at 100 percent strain, or elongation, of about 15 percent—without breaking.

Further, Experimental rubber Sample K@L broke at a strain (elongation) of 185 percent and a stress (tensile strength) of about 13.7 MPa, an increase in strain (elongation) of about 85 percent and in ultimate stress, or tensile strength, of at least 110 percent, compared to rubber Sample J.

In the Drawings: For the 150° C. Test Shown in FIG. 7:

(A) for Control Rubber Sample J

Control rubber Sample J (without both ENR compatiblizer and short fiber reinforcement) broke at a strain (ultimate elongation at break) of about 69 percent at a stress (tensile strength) of about 3 MPa, prior to its intended completion of the tests.

(B) for Experimental Rubber Sample K@P

In contrast, for Experimental rubber Sample K, the K@P Stress value at about 69 percent strain (where rubber Sample J broke) increased to about 3.4 MPa without breaking, representing an increase in Stress value at 100 percent strain, or elongation, of about 13 percent—without breaking.

Further, Experimental rubber Sample K@P broke at a strain (elongation) of about 95 percent and a stress (tensile strength) of about 5.8 MPa, an increase in strain (elongation) of at least 70 percent and in ultimate stress, or tensile strength, of over 90 percent, compared to rubber Sample J.

(C) for Experimental Rubber Sample K@L

For additional contrast, for Experimental rubber Sample K, the K@L Stress value at about 70 percent strain (where rubber Sample J broke) increased to about 3.1 MPa without breaking, as reported in Table 7, representing an increase in Stress value at 100 percent strain, or elongation, of about 3 percent—without breaking.

Further, Experimental rubber Sample K@L broke at a strain (ultimate elongation) of about 96 percent and a stress (tensile strength) of about 4.8 MPa, an increase in strain (increase in ultimate elongation at break) of about 39 percent and in ultimate stress, or tensile strength, of about 60 percent, compared to rubber Sample J.

These observations are considered herein to be additionally significant as they are further indicative of greater durability of rubber Sample K with the inclusion of the pre-formed aramid fiber masterbatch together with the ENR as compared to rubber Sample J without the aramid fiber masterbatch and the ENR.

While certain representative embodiments and details have been shown for the purpose of illustrating the subject invention, it will be apparent to those skilled in this art that various changes and modifications can be made therein without departing from the scope of the subject invention.

What is claimed is:

1. A method of preparing a rubber composition containing at least one diene-based elastomer, aramid short fibers and epoxidized cis 1,4-polyisoprene rubber where said method is comprised of, based on parts by weight per 100 parts by weight rubber (phr):
   (A) preparing a pre-formed masterbatch comprised of a dispersion of aramid short fibers in an epoxidized natural cis 1,4-polyisoprene rubber having an epoxidation in a range of from about 5 to about 60 percent, followed by
   (B) blending a sufficient amount of said pre-formed masterbatch with another rubber composition comprised of at least one diene-based elastomer other than said epoxidized natural cis 1,4-polyisoprene rubber to provide a rubber composition comprised of, based on parts by weight per 100 parts by weight elastomers (phr):
   (1) 100 phr of diene-based elastomers comprised of:
      (a) about 10 to about 95 phr of at elastomers, other than epoxidized natural cis 1,4-polyisoprene rubber, comprised of at least one of polymers and copolymers of isoprene and 1,3-butadiene and copolymers of styrene with at least one of isoprene and 1,3-butadiene as non-functionalized elastomers, and
      (b) about 5 to about 100 phr of epoxidized natural cis 1,4-polyisoprene rubber, and
   (2) about 30 to about 100 phr of particulate reinforcement consisting of
      (a) rubber reinforcing carbon black, or
      (b) synthetic amorphous precipitated silica, or
      (c) combination of rubber reinforcing carbon black and synthetic amorphous precipitated silica containing up to about 80 phr of said precipitated silica together with a silica coupler for said precipitated silica; and
   (3) about 0.5 to about 30 phr of said short aramid fibers.

* * * * *